Nov. 22, 1932.  G. R. BOTT  1,888,215

ANTIFRICTION BEARING

Filed Feb. 6, 1930

INVENTOR
George R. Bott
BY C. P. Zoepel
his ATTORNEY

Patented Nov. 22, 1932

1,888,215

UNITED STATES PATENT OFFICE

GEORGE R. BOTT, OF STAMFORD, CONNECTICUT, ASSIGNOR TO NORMA-HOFFMANN BEARINGS CORPORATION, OF STAMFORD, CONNECTICUT, A CORPORATION OF NEW YORK

ANTIFRICTION BEARING

Application filed February 6, 1930. Serial No. 426,252.

This invention relates to anti-friction bearings, and more particularly to bearings of that type, which are of more or less recent development in the art and are generally known as grease-packed or self-lubricating bearings.

The invention forming the subject matter of the present application is in part a continuation of my pending application for patent filed December 29, 1927, Serial No. 243,301, and has for its general object and purpose to provide a unitary self contained bearing particularly designed for use in connection with operating motors for suction cleaners, washing machines, electric fans and other houshold appliances, and in which the several parts of the bearing unit are permanently assembled by the manufacturer to retain a body of grease or lubricant in contact with the anti-friction bearing elements and relatively movable surfaces of the inner and outer race rings which cooperate therewith. Such grease-packed bearing units may therefore, be carried in stock, ready for use, for an indefinite length of time, without danger of corrosion or other injury to the various parts which might be caused by atmospheric influences.

It is one of the important objects of the invention to provide an improved form and construction of side plate for the bearing unit, together with means whereby said plate may be easily and quickly attached to the outer peripheral portion of the outer bearing ring, and with the inner edge of said side plate in clearance relation to the inner bearing ring.

It is a further object of my invention, in one embodiment thereof, to provide the bearing unit with an inner race ring of greater width than the outer ring and projecting beyond one side thereof, together with a novel form of the side plate having its inner edge in clearance relation to the inner ring and having a felt sealing gasket and retaining washer associated therewith, the several parts being so constructed and arranged as to provide a comparatively large grease containing space at one side of the rotatable bearing elements, without necessitating a material increase in the maximum width of the bearing unit.

It is also an object of my invention to provide a grease packed bearing unit of the above character, in which the several parts are of very simple construction, so that they may be produced at low manufacturing cost.

With the above and other objects in view, the invention consists in the improved anti-friction bearing, and in the form, construction and relative arrangement of the several parts, as will be hereinafter more fully described, illustrated in the accompanying drawing, and subsequently incorporated in the subjoined claims.

In the drawing, wherein I have disclosed several simple and practical embodiments of the invention, and in which similar reference characters designate corresponding parts throughout the several views,—

Figure 1:
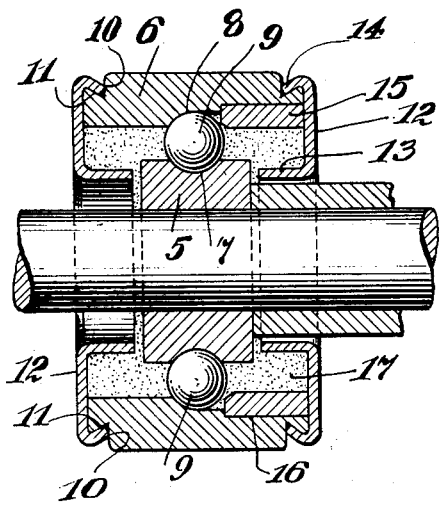
Figure 1 is a diametrical section of an open type ball bearing, illustrating one embodiment of my invention.
Figure 2:
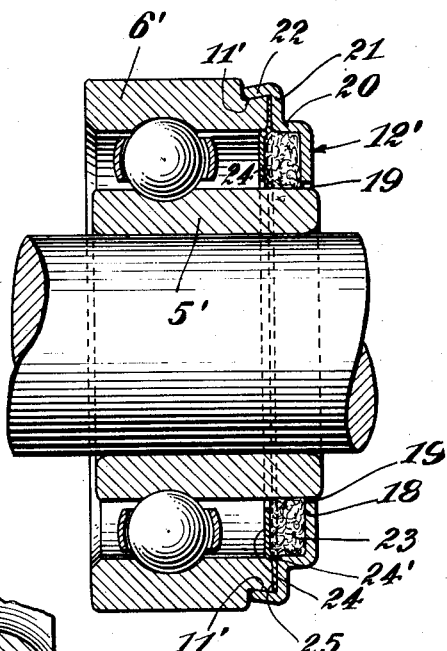
Fig. 2 is a similar sectional view of a closed type bearing showing another embodiment of my present improvements applied to one side thereof.

Referring now in detail to the drawing, and more particularly to Fig. 1 thereof, the bearing unit includes an inner ring 5 and outer ring 6, said bearing rings being provided in their opposed peripheral faces with the annular races 7 and 8 respectively, to receive the anti-friction balls or other roller elements 9. In this particular case, I have illustrated an open type bearing, though it will be understood as the description proceeds that this embodimnt of my invention may be applied as well to bearings of the closed type, an example of which is shown in Fig. 2.

The outer bearing ring 6 is of a width substantially twice the width of the inner ring 5 and projects laterally beyond each of the side faces of said inner ring. Said outer ring at its opposite ends has an annular groove cut or formed in the outer periphery thereof, each of said grooves having an inner radially disposed wall 10 and a base wall 11 inwardly inclined from the end or edge face of the bearing ring to the radial wall 10.

To the opposite ends of the outer ring 6, lubricant holding side plates are attached. In this construction, each of these side plates consists of a sheet metal die stamping generally indicated at 12 having a central boss formed by an annular flange 13 projecting laterally from one side of the plate 12 around a central opening thereof. This flange is of less diameter than the outer diameter of the inner bearing ring 5.

Each of the plates 12 at its outer edge is pressed or crimped into one of the grooves formed in the outer side of the bearing ring 6 as shown at 14 to extend inwardly and downwardly upon the inclined base wall 11 of the groove. Thus, the side plates will be securely locked at their outer edges in connection with the outer bearing ring, and against lateral movement with respect thereto and with the inner ends of the annular flanges 13 of said plates positioned in closely contiguous relation to the opposite side faces of the inner bearing ring 5. A retaining ring 15 is fitted within the counterbored section 16 of the outer ring 6 at one side of its race 8, the inner edge of said ring 15 which abuts against the internal shoulder of the bearing ring 6 being positioned closely contiguous to the balls or other antifriction elements 9 so as thus to prevent any appreciable lateral shifting movement of the elements 9 or the outer bearing ring 6 relative to each other.

In the construction above described, it will be seen that the spaces between the inner and outer rings 5 and 6 and the side plates 12 at each side of the row of balls or other anti-friction elements 9 are substantially completely enclosed. These spaces are completely filled or packed with a lubricating grease indicated at 17.

It will be apparent from the foregoing that by reason of the construction of the side plates and the manner of attaching the same to the outer bearing unit with the grease bodies packed into the spaces at each side of the row of anti-friction bearing elements may be very easily and quickly assembled and will remain permanently in their proper relative positions during storage or shipment to the ultimate user. Of course, in the actual use of the bearing, a certain degree of heat is generated, and the bodies of grease contained in the bearing unit will therefore, be somewhat softened so that in the relative rotation of the parts, a proper and continuous supply of lubricant, maintaining a constant lubricating film between the relatively movable contacting surfaces will be brought about.

Figure 3:
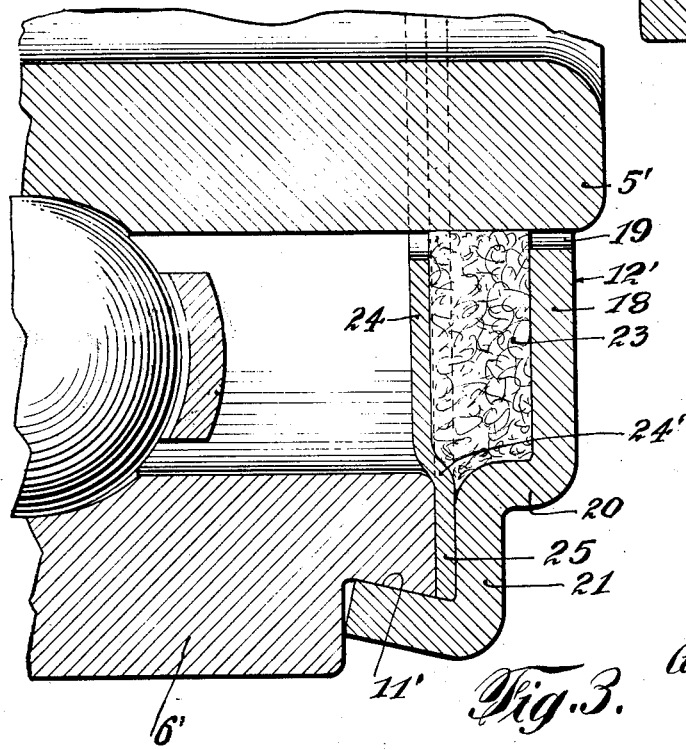
Fig. 3 is an enlarged fragmentary sectional view of the latter form of the device.

In Figs. 2 and 3 of the drawing, I have shown another embodiment of my present improvements, but in this case, the inner bearing ring 5' is somewhat wider than the other bearing ring 6', and at one of its ends projects laterally to the corresponding end edge of the outer bearing ring. In this form of my invention, the side plate 12' is stamped in the form of a shallow cup having its radially disposed wall 18, when said plate is attached to the outer bearing ring 6', disposed in a plane which is adjacent to, but inwardly of the plane of the end edge face of the inner bearing ring 5'. In other words, this cup wall 18 has a central opening through which the end of the bearing ring 5' projects. The edge of this opening is in clearance relation to the outer peripheral surface of the ring 5' as shown at 19.

The side plate 12' at the outer edge of its radial wall 18 is laterally flanged as at 20 to form the annular wall of the cup, and from said annular wall, a radially disposed annular section 21 of the plate extends outwardly. The outer edge portion of this latter section of the plate 12' is spun or crimped inwardly and downwardly as at 22 upon the inwardly sloping or inclined base wall 11' of the annular groove provided in the outer face of the bearing ring 6'.

Before thus assembling the side plate in permanently attached relation to the outer bearing ring, an annular gasket of felt or other material 23 is first placed within the holder cup or cavity formed by the parts 18 and 20 of the side plate. A thin steel washer plate 24 is then superimposed upon the gasket plate 23. The outer edge portion of this washer plate is laterally offset as shown at 25 and extends over the inner surface of the part 21 of the side plate. Thus, as clearly shown in Fig. 3 of the drawing, when the side plate is applied, the outer edge portion 25 of the metal disc or washer will be interposed between the end face of the outer bearing ring 6' and the part 21 of said side plate and will be tightly clamped or confined therebetween, when the edge portion 22 of the side plate is spun or crimped inwardly upon the inclined surface 11' of the bearing ring.

From reference to Figs. 2 and 3, it will be noted that by the provision of the offset 24' in the washer plate 24, the inner part of said plate is disposed in a plane substantially parallel to but inwardly of the plane of the adjacent end or edge face of the outer bearing ring 6'. Therefore, the felt gasket 23 in contact with the outer face of this inner part of the washer 24 will also extend within the outer bearing ring. It results from this construction that the width of the part 20 of the side plate may be reduced to a minimum and the part 18 of said plate positioned comparatively close to the end face of the bearing ring 6', thus correspondingly reducing the length of the extension of the inner bearing ring 5' beyond said outer ring 6'. Nevertheless, the lubricant holding capacity is not appreciably reduced, since the felt gasket 23 being more or less absorbent acts as a reserve lubricant holding reservoir. This gasket at its inner edge has close contact upon the peripheral surface of the inner ring 5' so as to retain the lubricant within the bearing, and at the same time effectively exclude the entrance of dust or dirt between said bearing ring and the side plate to the interior of the bearing where it would collect upon the rolling anti-friction bearing elements.

It will be apparent that the above construction provides a bearing unit having a relatively large lubricant holding or retaining capacity. At the same time, I retain the simple and inexpensive form of the parts with the same means for easily, quickly and permanently attaching the side plate to the outer bearing ring as heretofore described, and without increasing the overall width of the bearing beyond permissible limits for the particular commercial adaptation and use of this type of bearing.

From the foregoing description considered in connection with the accompanying drawing, the several embodiments of my present improvements as herein disclosed will be fully and clearly understood. It will of course, be evident that if desired, in the construction shown in Fig. 2, the inner ring might be of increased width and extended beyond the other edge of the outer bearing ring 6' and a second side plate also applied to the latter edge of the outer bearing ring, in a similar manner to that indicated in the construction and embodiment of the invention illustrated in Fig. 1 of the drawing. Further, it will be appreciated that while I have illustrated and described in connection with each of the above referred to forms of my invention, the several detail structural characteristics of the lubricant retaining side plates, it will nevertheless be understood that as to such details, the invention is susceptible of more or less modification, and I therefore, reserve the privilege of resorting to all such legitimate changes therein as may be fairly incorporated within the spirit and scope of the invention as claimed.

I claim:

1. An anti-friction bearing unit including inner and outer circular members, bearing elements between said members, said inner circular member being of greater width than the outer member and projecting at one of its ends laterally beyond the latter, said outer circular member having an annular groove in its outer surface provided with a base wall inclined inwardly from one end face of said member, a cup-shaped side plate consisting of a sheet metal stamping arranged with the open side of the cup opposed to the space between said inner and outer circular members and having its outer edge angularly offset and pressed into said groove in bearing contact upon the inclined base wall thereof to retain said plate in fixed relation to the outer circular member, the body wall of said cup having a central opening through which the end of the inner circular member projects, a felt sealing gasket within said cup and in contact with the outer surface of said inner circular member, and a sheet metal washer plate having an inner portion bearing against the inner side of said gasket to confine the same within the cup and having its outer edge portion rigidly clamped by a part of said side plate against the edge face of the outer circular member.

2. An anti-friction bearing unit including inner and outer circular members, said inner member being of greater width than the outer member and projecting at one of its ends laterally beyond the outer member, a shallow cup-shaped side plate consisting of a sheet metal stamping arranged with the open side of the cup opposed to the space between said inner and outer circular members and having a central opening in its body wall through which the end of the inner circular member projects, said side plate having its outer edge laterally offset and the outer bearing ring being provided in its outer face with an annular groove in which said offset edge of the side plate is engaged to fixedly secure the side plate in connection with said bearing ring, a lubricant confining and dust excluding sealing gasket within the cup of said side plate projecting beyond the open side of the cup and within the outer bearing ring, and a washer plate having an inner portion bearing against the inner side of the gasket to confine the same within the cup and provided with an offset outer portion rigidly clamped by a part of the side plate against the edge face of the outer circular member.

3. An anti-friction bearing unit including inner and outer circular members and bearing elements engaged in races in the opposed faces of said members, said outer circular member at one of its lateral edges and in the outer surface thereof being provided with an annular groove having a base wall inclined inwardly from said lateral face towards the axis of the bearing, and a radially disposed shoulder at the inner side of said base wall, and a side plate substantially closing the space between said circular members to confine a body of lubricant therein at one side of the bearing elements, said plate at its outer edge extending over the lateral edge face of the outer circular member, and having an inwardly turned flange clinched upon the inclined base wall of said groove and abutting at its free edge against said radial wall thereof, whereby said plate is rigidly fixed to the outer circular member as a permanently assembled component part of the bearing unit.

4. An anti-friction bearing unit including inner and outer race rings and a plurality of bearing elements therebetween, said outer race ring being of greater width than the inner ring and projecting laterally beyond the plane of one edge face of the inner ring, said projecting part of the outer ring having an annular groove on its outer surface, and a side plate having an inwardly turned flange on its outer edge clinched into said groove in frictional contact with the walls thereof to retain said plate in fixed relation to the outer circular member as a permanently assembled part of said unit, and said plate being provided in coinciding axial relation to the inner bearing ring with an inwardly extending tubular part terminating in contiguous relation to the edge face of said inner bearing ring.

In testimony that I claim the foregoing as my invention, I have signed my name hereto.

GEORGE R. BOTT.